O. H. DENNIS.
Grain-Drill.
No. 26,420.
Patented Dec. 13, 1859.
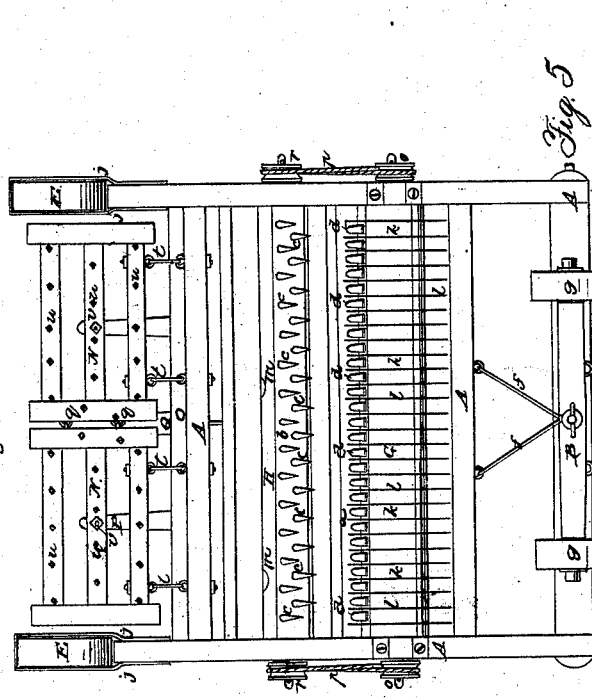
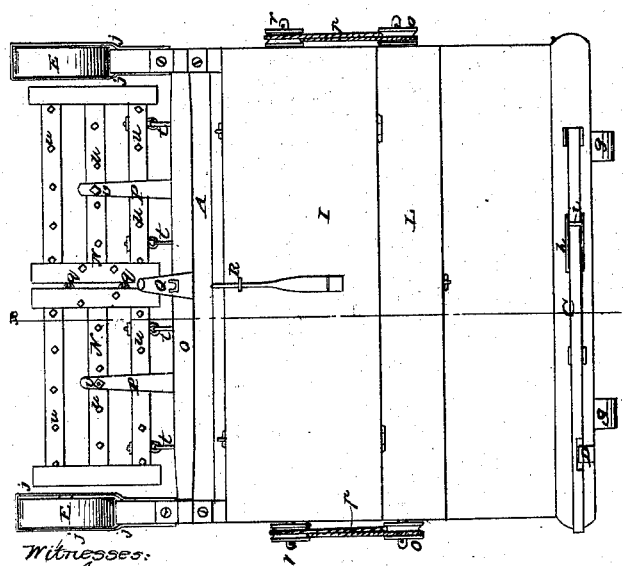
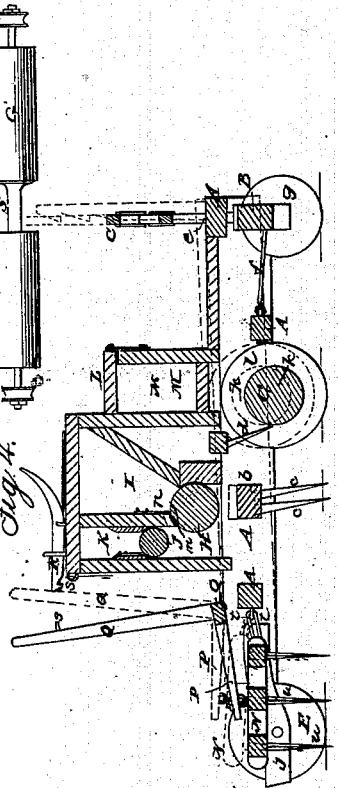
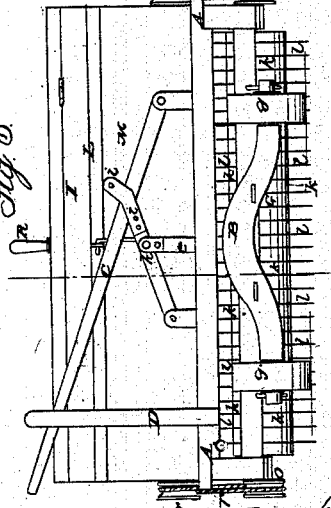

UNITED STATES PATENT OFFICE.

OLIVER H. DENNIS, OF ALTONA, ILLINOIS.

IMPROVEMENT IN SEEDING-MACHINES.

Specification forming part of Letters Patent No. 26,420, dated December 13, 1859.

*To all whom it may concern:*

Be it known that I, OLIVER H. DENNIS, of the town of Altona, in the county of Knox and State of Illinois, have invented a new and Improved Machine for Preparing, Planting, and Sowing Land with Various Seeds—as wheat, barley, rye, oats, grass and clover seed, corn, &c.; and I do hereby declare that the following is a full and exact description thereof, reference being had to the accompanying drawings, and to the letters of reference marked thereon—

Figure 1 being a plan of the machine; Fig. 2, a plan of the under side thereof; Fig. 3, a front elevation of the same; Fig. 4, a longitudinal vertical section thereof in the plane indicated by the line $x\,x$, Figs. 1 and 3; Fig. 5, view of a modification of one of the parts.

Like letters designate corresponding parts in all the figures.

The working parts of the implement are mounted in a frame, A, of suitable size and shape. The rear end of the frame is supported by two small wheels, E E, respectively mounted in bearings $j\,j$, which project backward from the side pieces of the frame, and may be adjustable up and down thereon. The front end of the frame is supported by two wheels, $g\,g$, on an axle, B, which turns on a king-bolt, $e$, to give freedom of action in turning, &c., as in carriages, and the shank of the said king-bolt extends upward through and is movable in a cross-piece of the frame for the purpose of adjusting the height of the machine, so that its cultivating parts may be entirely raised from the ground when not to be used, as in transporting and turning the machine, or be brought into action in the ground and adjusted to different depths therein, as desired. For producing this adjustment the upper end of the shank of the king-bolt $e$ is pivoted to a vibratory arm or lever, $h$, the movable end of which is connected with another vibratory lever, C, which latter lever is held at different heights by notches in a standard, D, on the frame of the machine. The lever C works freely between pins or friction-rollers $i\,i$ in the lever $h$, substantially as shown, in order to allow the necessary play between the two levers. Draft-rods $f\,f$ may extend backward from the king-bolt to a cross-piece of the frame, in order to prevent the breaking or bending of said king-bolt.

Behind the front wheels is, first, a set of circular knives or cutters, $l\,l$, on a transverse shaft or cylinder, G, at a distance of, say, two or three inches from each other, and between these cutters are placed metallic bands or washer-rings $k\,k$, which serve the double purpose of giving strength and weight to the shaft or cylinder and to keep the cutters in place. The object of these cutters is to cut in pieces the stalks, weeds, &c., which may be lying on the ground and prevent their accumulating before and clogging the cultivating and opening teeth $c\,c$ behind. Cleaners $d\,d$ extend downward from a bar, $a$, across the frame to the rear side of the washer-rings $k\,k$, between the cutters $l\,l$, substantially as represented, for the purpose of preventing the collection of dirt or other obstructions between the said cutters. When the ground is free from such obstructions the cutters $l\,l$ may be dispensed with, and a simple cylinder, G', Fig. 5, employed in the stead, for the purpose of turning the seeding-cylinder H, which receives its motion from a pulley or pulleys, $o$, on the axis of said cutter or simple cylinder, by means of a band or bands, $p$, passing from said pulley or pulleys to a pulley or pulleys, $r$, on its own axis.

Immediately behind the cutter-cylinder G is a set of cultivating and opening teeth, $c\,c$, secured in a cross-bar, $b$, generally in two rows, the teeth of which alternate in position, as shown in Fig. 2. These prepare the ground for receiving the seed which is dropped immediately behind them, and they are arranged so as to open furrows corresponding in position with the seeding-cavities $m\,m$ in the sowing-cylinder H, to sow or plant in drills or rows, as may be desired. When a fewer number of rows or drills is to be made part of the cavities $m\,m$ are stopped up for the purpose, and, if desired, a part of the teeth $c\,c$ may be removed to correspond therewith.

In addition to the regular sowing or planting cylinder H, a second sowing-cylinder, J, for sowing clover and other grass, or any small seeds, may be employed in a seed-box, K, just behind the principal seed-box I. A band passing from a pulley on the cylinder H to another pulley on its own shaft gives this cylinder a proper motion.

The seed is covered and the ground finally cultivated by means of harrows N N at the rear of the machine. These harrows (two or more, according to the width of the machine) are loosely hinged at $t\ t$ to a cross-piece of the frame A, to each other at $q\ q$, and at $v\ v$ to arms P P, respectively, projecting back over them from a rock-shaft, O, which is provided with a handle or lever, Q, projecting upward, so as to be conveniently reached by the driver. This lever is provided with a hook or staple, $s$, into which a spring-catch, R, on the top of the seed-box fastens when the lever is brought sufficiently forward, and thus holds the harrows up entirely away from the ground when they are not to be in use. The harrows have a sufficient number of teeth, $u\ u$, properly arranged for covering the seed, whether sowed or planted, in any number of drills or rows. The harrows arranged, as described, have a sufficiently free movement to adapt themselves to any irregularities of the surface of the ground to which they may ever be subjected. At the same time they are perfectly under control and efficient.

The implement may also be employed for simple cultivation between the rows of the growing crop. For this use there may be gaps in the cylinder G', as seen at S, Fig. 5, over the rows, so as not to injure the young plants, and in corresponding positions the teeth $d\ d$ are to be removed for the same purpose.

A seat, L, for the driver to sit on, is situated just in front of the seed-box I, and beneath the seat is a tool-box M, to carry such tools or articles as may be of use to have always at hand for repairing or for other purposes.

What I claim as my invention, and desire to secure by Letters Patent, is—

1. The combination and arrangement of the cylinder G, of circular cutters $l\ l$, with the cultivating and opening teeth $c\ c$, and with the sowing-cylinder H, substantially in the manner and for the purpose herein set forth.

2. In combination with the above, the arrangement of the loosely-hinged harrows N N in relation to each other and to the frame of the machine, and in combination with the arms P P, rock-shaft O, lever Q, and catch R, substantially as herein specified.

In witness whereof I have hereunto set my hand this 22d day of February, A. D. 1859.

OLIVER H. DENNIS.

In presence of—
  S. J. WELTON,
  V. A. WELTON.